United States Patent [19]
Thomas

[11] 3,780,840
[45] Dec. 25, 1973

[54] GEAR SELECTOR FOR A TRANSMISSION
[75] Inventor: Dalton A. Thomas, Alpine, Ala.
[73] Assignees: Hazel A. Beasley, Childersburg; Woodford R. Thompson, Jr.; Hugh P. Carter; William K. Murray, Birmingham, Ala. ; part interest to each
[22] Filed: May 19, 1972
[21] Appl. No.: 254,862

[52] U.S. Cl............ 192/48.91, 192/67 R, 192/108, 192/106.1, 192/114 T
[51] Int. Cl........................................ F16d 21/04
[58] Field of Search...................... 192/48.91, 67 R, 192/106.1, 108, 114 T

[56] References Cited
UNITED STATES PATENTS
| | | | |
|---|---|---|---|
| 1,387,017 | 8/1921 | Smith | 192/67 R X |
| 1,345,633 | 7/1920 | Pyle | 192/67 R |
| 1,907,619 | 5/1933 | Soden-Fraunhofen | 192/108 X |
| 2,180,597 | 11/1939 | Le Bus | 192/67 R |
| 2,791,131 | 5/1957 | Boughner | 192/48.91 X |

Primary Examiner—Allan D. Herrmann
Attorney—Hugh P. Carter et al.

[57] ABSTRACT

A selector for a transmission having power transmitting rotary members, such as gears, operatively connected to each other and mounted for rotation about an axis common with the axis of a shaft-like member. A gear selector element rotates with the shaft-like member adjacent each gear and is movable axially relative thereto with means urging each gear selector element away from the adjacent gear. Cooperating connector elements rotate with each gear selector element and the gear adjacent thereto. Each gear selector element is shifted toward the gear adjacent thereto by an actuator member to engage said cooperating connector elements until the actuator member is shifted and the connector element rotatable with the gear selector element moves to a position in advance of the connector element rotatable with said gear.

12 Claims, 25 Drawing Figures

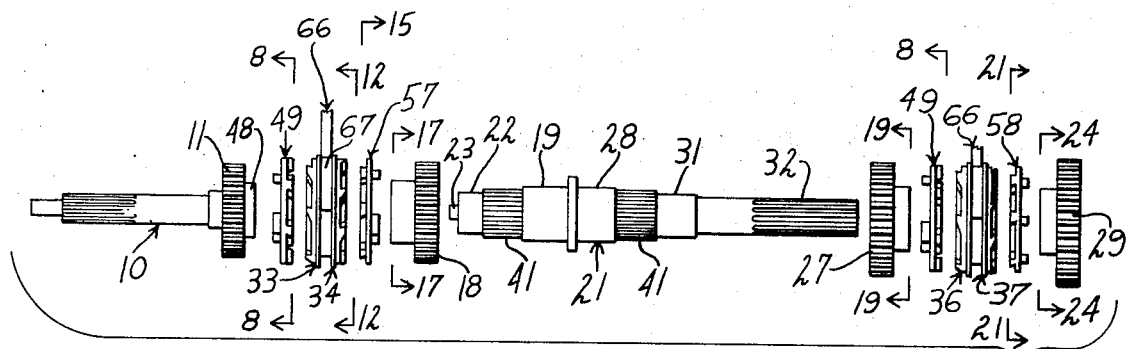
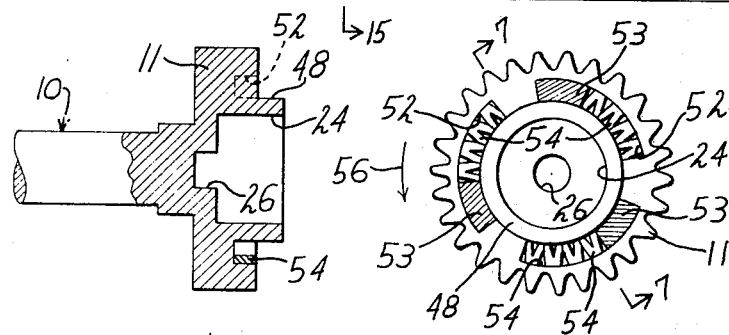
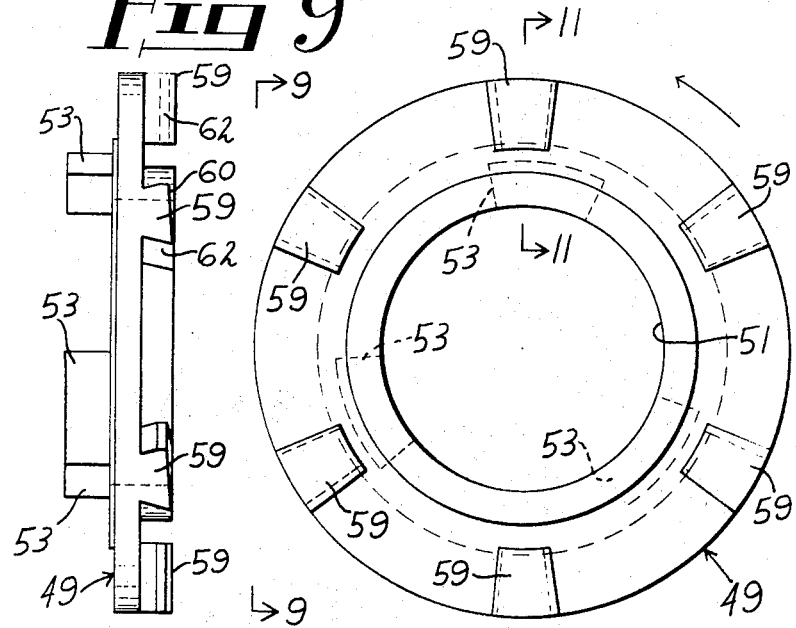
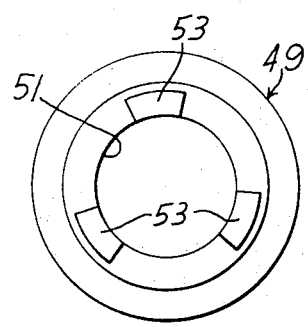
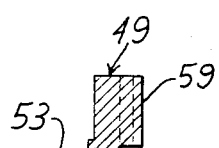

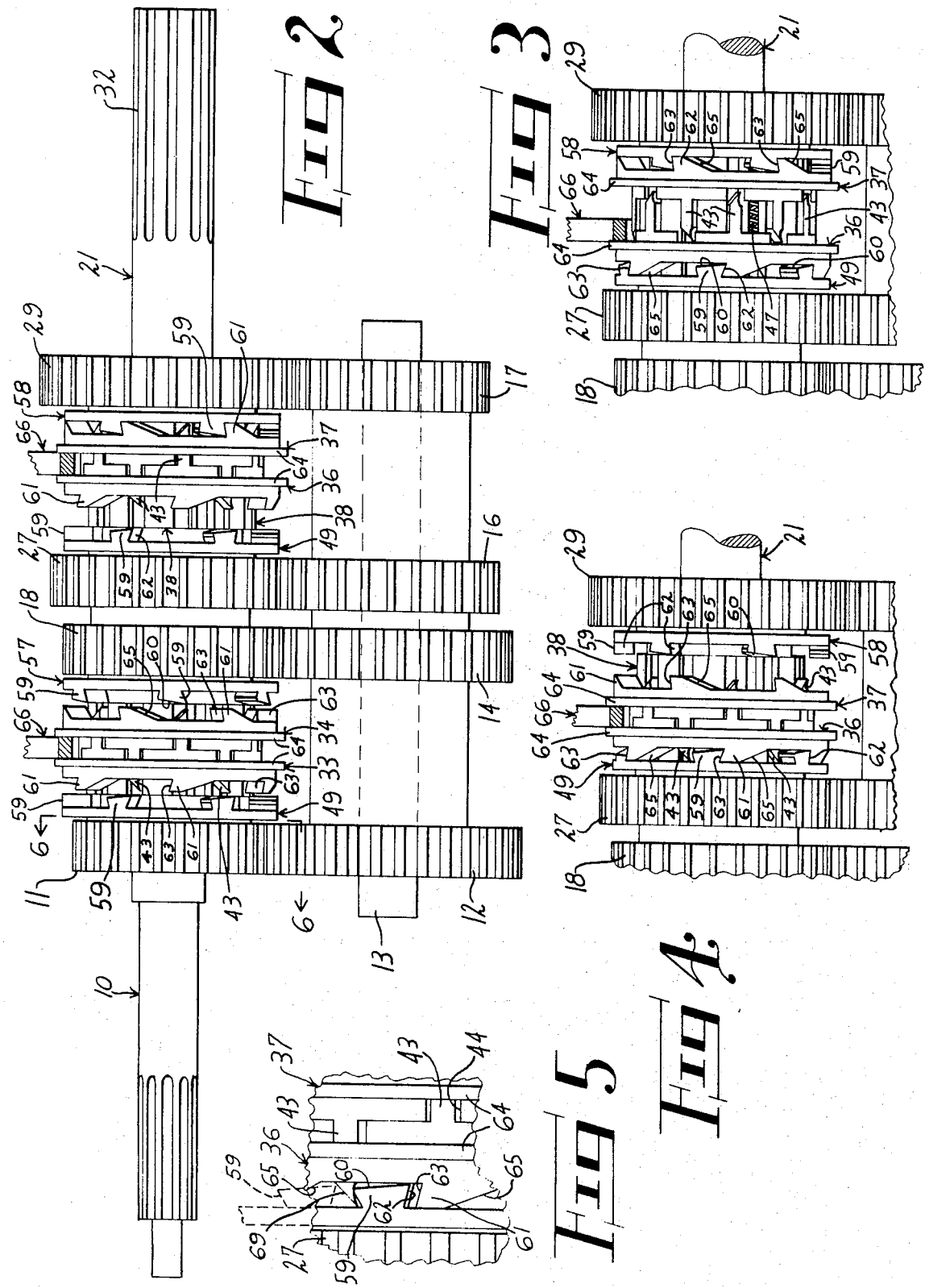

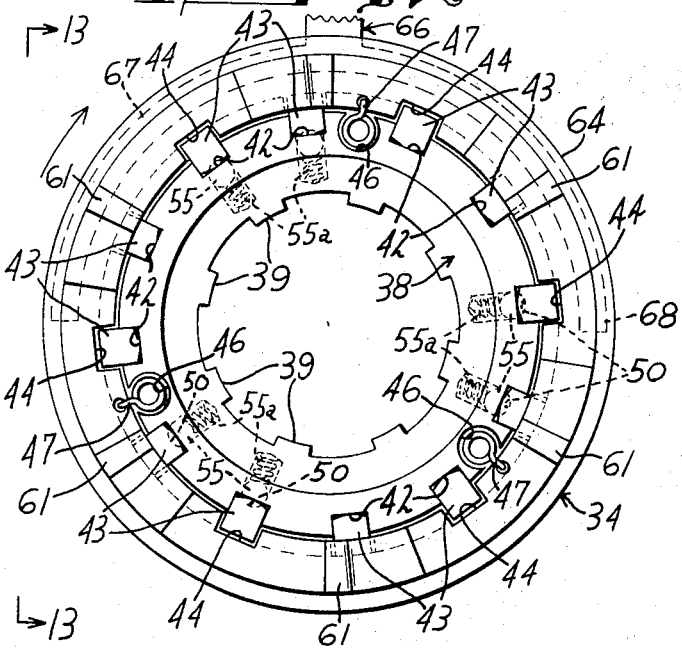
Fig 12.
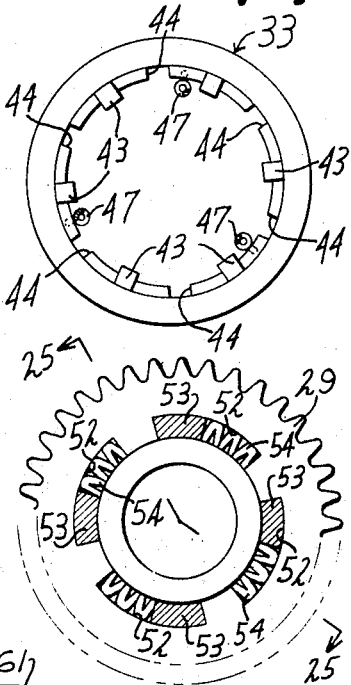
Fig 14.
Fig 24.
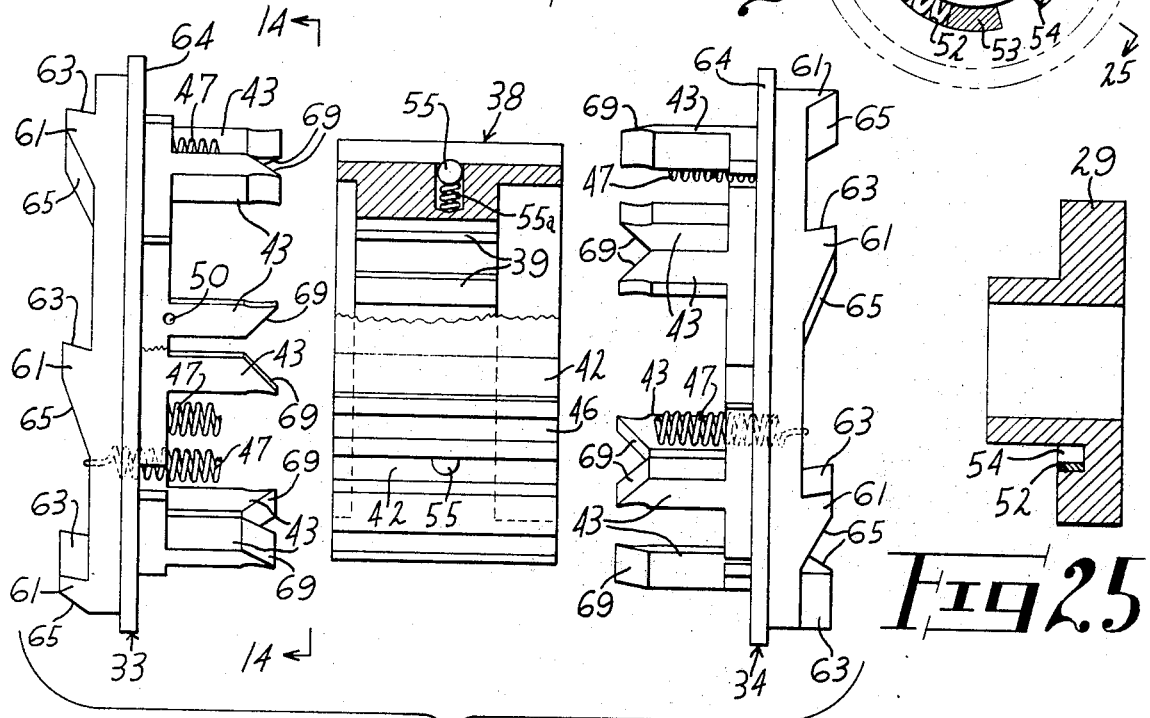
Fig 13.
Fig 25.

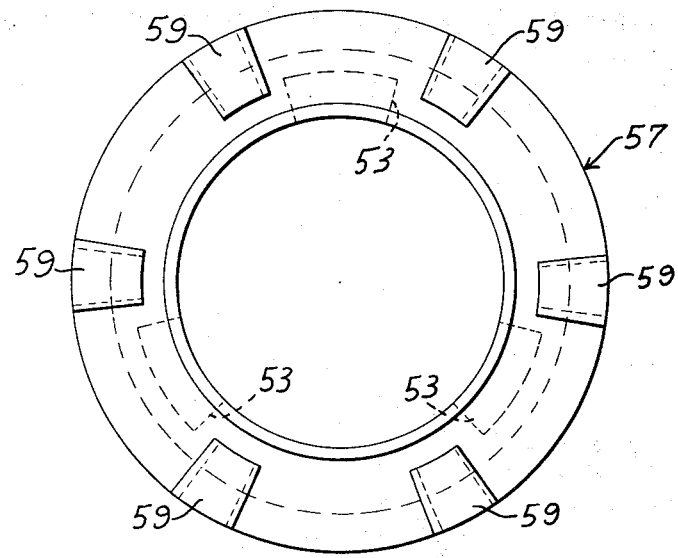
Fig 15
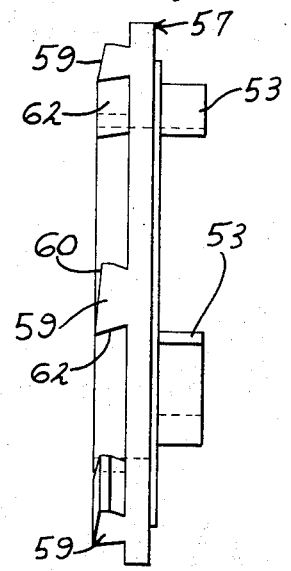
Fig 16
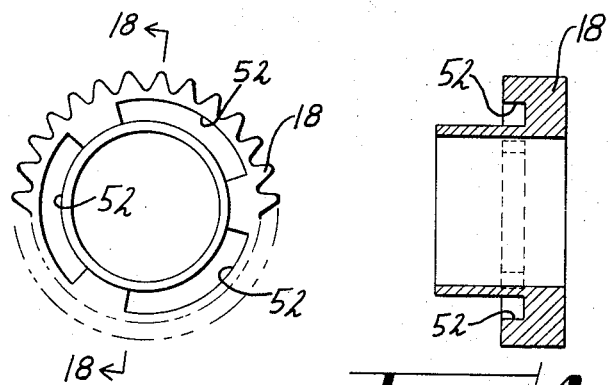
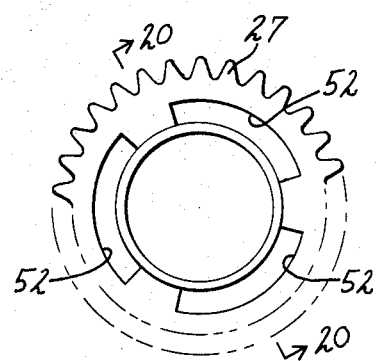
Fig 17  Fig 18  Fig 19
Fig 20
Fig 21  Fig 22
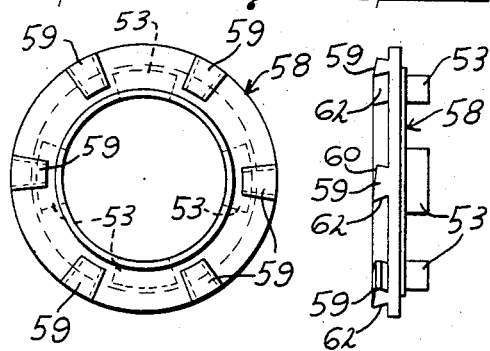
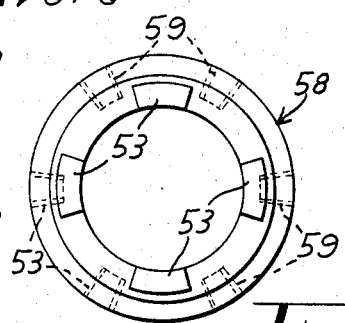
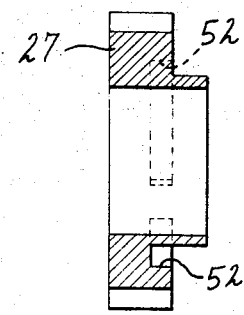
Fig 23

3,780,840

GEAR SELECTOR FOR A TRANSMISSION

BACKGROUND OF THE INVENTION

This invention relates to a selector for a transmission and more particularly to mechanism for shifting the power transmitting rotary members, such as gears of the transmission to selected positions without having to decrease the speed of rotation of the gears during the shift operation.

Heretofore in the art to which my invention relates, it has been the usual practice to shift gears by disengaging the clutch between the transmission and the motor and then placing the gear selector in a neutral position there is a reduction in the speed of rotation of the gears being shifted during the shifting operation. This not only necessitates the operation of the clutch each time the gears are changed in the transmission but also decreases the speed of rotation of the gears whereby the gears must start from a reduced speed each time the gears are changed.

BRIEF SUMMARY OF THE INVENTION

In accordance with my present invention, I provide a selector mechanism for a transmission having power transmitting member, such as gears operatively connected to each other and mounted for rotation about an axis common with the axis of rotation of a shaft-like member. Adjacent each gear is a gear selector element which rotates with the shaft-like member and is movable axially relative to the gear with each gear selector element being urged away from the adjacent gear. Cooperating connector elements rotate with each gear selector element and the gear adjacent thereto. An actuator member moves each gear selector element toward the adjacent gear to engage the cooperating connector elements with each other until the actuator member is shifted and the connector element rotatable with the gear selector element moves to a position in advance of the connector element which is rotatable with the gear.

DESCRIPTION OF THE DRAWINGS

Apparatus embodying features of my invention is illustrated in the accompanying drawings, forming a part of this application, in which:

FIG. 1 is an exploded view showing the various components of the mechanism separated from each other;

FIG. 2 is a side elevational view corresponding to FIG. 1, drawn to a larger scale, showing the gear mechanism in first gear position and including the idler gear arrangement for operatively connecting the gears to each other, the actuator member for the gear selector mechanism being broken away and in section, for the sake of clarity;

FIG. 3 is a fragmental view of the apparatus shown in FIG. 2 showing the position of the mechanism immediately upon shifting the actuator member for the gear selector to second gear position and prior to release of the first gear;

FIG. 4 is a fragmental view corresponding to FIG. 3 showing the actuator member for the gear selector in second gear position immediately after release of the first gear;

FIG. 5 is an enlarged, fragmental view showing the stop member which limits rearward movement of the connector element which is rotatable with the adjacent gear;

FIG. 6 is a sectional view taken generally along the line 6—6 of FIG. 2;

FIG. 7 is a fragmental, sectional view taken generally along the line 7—7 of FIG. 6;

FIG. 8 is an enlarged, view taken generally along the line 8—8 of FIG. 1;

FIG. 9 is an elevational view taken generally along the line 9—9 of FIG. 8;

FIG. 10 is a side elevational view showing the opposite side of the apparatus shown in FIG. 8, drawn to a smaller scale;

FIG. 11 is a fragmental, sectional view taken generally along the line 11—11 of FIG. 8;

FIG. 12 is an enlarged side elevational view taken generally along the line 12—12 of FIG. 1;

FIG. 13 is an exploded view taken generally along the line 13—13 of FIG. 12, partly broken away and in section, and showing the gear selector elements separated from the shaft-like member;

FIG. 14 is a side elevational view taken generally along the line 14—14 of FIG. 13, drawn to a smaller scale;

FIG. 15 is an enlarged, side elevational view taken generally along the line 15—15 of FIG. 1;

FIG. 16 is an end elevational view of the apparatus shown in FIG. 15;

FIG. 17 is a side elevational view, drawn to a larger scale, taken generally along the line 17—17 of FIG. 1, parts being omitted for the sake of clarity;

FIG. 18 is a sectional view taken generally along the line 18—18 of FIG. 17;

FIG. 19 is a side elevational view taken generally along the line 19—19 of FIG. 1, drawn to a larger scale with parts being omitted for the sake of clarity;

FIG. 20 is a sectional view taken along the line 20—20 of FIG. 19;

FIG. 21 is a side elevational view, drawn to a larger scale, taken generally along the line 21—21 of FIG. 1;

FIG. 22 is an end elevational view of the apparatus shown in FIG. 21;

FIG. 23 is a side elevational view of the apparatus shown in FIG. 21 showing the opposite side thereof;

FIG. 24 is a side elevational view, drawn to a larger scale, taken generally along the line 24—24 of FIG. 1; and, FIG. 25 is a sectional view taken generally along the line 25—25 of FIG. 24.

Referring now to the drawings for a better understanding of my invention, I show a conventional main drive shaft 10 which is connected to a conventional clutch, not shown, in the usual manner. The main drive shaft 10 carries power transmitting member, such as a main drive gear 11, which constitutes the fourth speed gear for the transmission. As shown in FIG. 2, the gear 11 is in mesh with power transmitting rotary members, such as a gear 12, mounted on an idler shaft 13 which in turn is mounted for rotation in the transmission housing in the usual manner. Mounted for rotation with the idler shaft 13 are power transmitting rotary members or gears 14, 16 and 17. The gear 14 is in mesh with power transmitting rotary members in the form of a third speed gear 18 which rotates freely on a smooth surfaced portion 19 of a main shaft 21, as shown in FIG. 1. One end of the shaft 21 is provided with reduced diameter portions 22 and 23 which engage with a rotating fit bearing surfaces 24 and 26, respectively, provided in the adjacent end of the main drive shaft 10, as shown in FIGS. 6 and 7. The gear 16 is in mesh with power transmitting rotary member in the form of a second speed gear 27 which is adapted to rotate freely on a smooth surface 28 on the shaft 21, as shown in FIG. 1. The gear 17 is in mesh with power transmitting rotary member in the form of a first speed gear 29 which rotates freely on a smooth surface 31 on the shaft 21, as shown. The output end of the main shaft 21 may be provided with the usual splines 32 for connection to a member to be driven, such as a driven shaft for a vehicle.

While I have shown the teeth on the gears described hereinabove as extending generally parallel to the shafts 10 and 21, it will be apparent that the teeth may be of various configurations well known in the art to which my invention relates. That is, the teeth on the gears, would be of the conventional type employed in transmissions. In view of the fact that the gear arrangement described hereinabove is conventional and the power transmitting rotary member may be in forms other than gears, no further description thereof is deemed necessary. Accordingly, the reference to gear is intended to include any suitable form of power transmitting rotary member.

My improved gear selector mechanism is mounted between adjacent pairs of gears 11–18 and 27–29. As shown in FIGS. 1 and 2, the gears 11, 18, 27 and 29 rotate about an axis which is common with the axis of rotation of the shafts 10 and 21. Mounted nonrotatably on the shaft 21 adjacent a side of each of the gears 11, 18, 27 and 29 are gear selector elements 33, 34, 36 and 37, respectively. Each gear selector element is adapted for axial movement relative to the shaft 21. Preferably, each pair of gear selector elements 33–34 and 36–37 are mounted on a shaft-like member in the form of a sleeve 38 having internal splines or keys 39 which are adapted to cooperate with corresponding splines 41 carried by the shaft 21 whereby the sleeve 38 rotates with the shaft 21. As shown in FIGS. 12 and 13, angularly spaced, axially extending grooves 42 are provided in the outer surface of the sleeve 38 in position to receive elongated, angularly spaced guide members 43 carried by and extending laterally from the gear selector elements 33, 34, 36 and 37. The elongated members 43 are rectangular, as viewed in cross section whereby they slide freely in the grooves 42 to permit axial movement of the gear selector elements relative to the sleeve 38 and the shaft 21. Also, the ends of the elongated members 43 serve as stop members to limit relative rearward movement of the gear adjacent thereto in a manner to be described hereinafter. As shown in FIG. 13, the elongated laterally extending guide members 43 are formed integrally with the gear selector elements with the free end of each elongated member 43 of one gear selector element riding in a groove 44 extending axially of the adjacent, oppositely disposed gear selector element. For example, the elongated members 43 carried by the gear selector element 33 ride in grooves 44 provided in the gear selector element 34 while the elongated members 43 carried by the gear selector element 34 ride in grooves 44 provided in the gear selector element 33. Accordingly, the gear selector elements 33 and 34 are adapted for axial movement toward and away from each other while the gear selector elements 36 and 37 are also adapted for axial movement relative to each other.

Longitudinally extending recesses 46 are provided in the outer surface of the sleeve 38 for receiving tension springs 47, as shown. The ends of the springs 47 are connected to the adjacent gear selector elements whereby adjacent gear selector elements are urged toward each other and away from their associated gear. That is, the springs 47 urge the gear selector elements 33 and 34 toward each other whereby the gear selector element 33 is urged away from gear 11 while gear selector element 34 is urged away from gear 18. In like manner, the springs 47 urge the gear selector elements 36 and 37 toward each other with the gear selector element 36 being urged away from gear 27 and gear selector element 37 being urged away from gear 29.

Alternate ones of the elongated members 43 are provided with inwardly facing recesses 50 for receiving ball-like members 55 which are urged toward the recesses 50 by compression springs 55a, as shown in FIGS. 12 and 13. The cooperation of the ball-like members 55 in the recesses 50 aid in retaining the gear selector elements 33, 34, 36 and 37 in a neutral position relative to the sleeve 38. Upon shifting a gear selector element away from neutral position, the ball-like members 55 carried thereby compress the springs 55a associated therewith whereby the ball-like members 55 move out of their recesses 50.

As shown in FIG. 7, an annular shoulder 48 is provided at the side of the gear 11 adjacent the gear selector element 33 for receiving an annular member 49 having a centrally disposed opening 51 therein for receiving the annular shoulder 48. Angularly spaced recesses 52 are provided in the side of the gear 11 in position to receive laterally projecting detents 53 carried by the annular member 49. As shown in FIG. 6, each recess 52 is arcuate in shape and is of a length to receive a suitable compression spring 54 to serve as a shock absorber as the gear 11 is driven in the direction of the arrow 56. Each compression spring 54 may comprise a plurality of separate generally V-shaped components, as shown, or may be formed as an integral member. In view of the fact that various forms of compression springs well known in the art may be employed no further description thereof is deemed necessary. In like manner, an annular member 49 is connected to the gear 27, there being arcuate recesses 52 in the face of the gear 27 adjacent the annular member 49 for receiving the laterally projecting detents 53.

As shown in FIGS. 1, 15–18 and 21–23, annular members 57 and 58 are carried by the gears 18 and 29. Each of the annular members 57 and 58 is provided with laterally projecting detents 53 which engage recesses 52 provided in the gears 18 and 29, as described hereinabove relative to the annular members 49. Also, compression springs 54 are provided in the arcuate recesses 52 to form a shock absorber, as described above. Since the compression springs 54 employed in the arcuate recesses 52 of the gears 18 and 27 are identical to the compression springs employed in the arcuate recesses in gears 11 and 29, the arcuate springs have been omitted from the recesses 52 in gears 18 and 27 shown in the drawings.

Angularly spaced connector elements 59 are carried by the annular members 49, 57 and 58 in position to cooperate with connector elements 61 carried by the adjacent gear selector element 33, 34, 36 or 37, as the case may be. As clearly shown in FIGS. 9, 16 and 22, each connector element 59 is provided with a cam surface 62 which slopes forwardly and away from the gear adjacent thereto as viewed in the direction of rotation of the adjacent gear. In like manner, each connector element 61 carried by the gear selector elements is provided with a cam surface 63 which also slopes forwardly and away from the gear adjacent thereto, as viewed in the direction of rotation of the adjacent gear. Accordingly, the sloping cam surfaces of the connector elements 59 and 61 are adapted to move into and out of engagement with each other upon axial movement of the gear selector element toward and away from the gear adjacent thereto with the cooperating surfaces 62 and 63 interlocking with each other upon movement of the connector elements 59 and 61 into engagement with each other.

As shown in FIGS. 2 through 5, an outer portion of each connector element 59 and 61 is provided with a cam surface 60 and 65, respectively, which slopes forwardly and away from the adjacent gear, as viewed in the direction of rotation of the gear. Accordingly, upon removal of the elongated stop member 43 from the path of movement of the adjacent connector element 59, the connector element 59 can move in a rearward direction relative to connector element 61. That is, the cooperating surfaces 62 and 63 can rotate in a direction away from each other as the cam surfaces 60 and 65 engage and move relative to each other.

As shown in FIGS. 1 through 4 and 13, each gear selector element 33, 34, 36 and 37 is provided with an outwardly projecting annular flange 64. The annular flanges 64 of adjacent gear selector elements 33-34 and 36-37 define an annular recess for receiving an actuator member in the form of a shift fork 66 having legs 67 and 68. The shift fork 66 is of the conventional type employed on transmissions for automobiles and the like. In view of the fact that the mechanism for operating such shift forks is well known in the art, no further description thereof is deemed necessary. The shift fork 66 is adapted to shift each gear selector toward the gear adjacent thereto so that its cooperating connector element 61 moves into engagement with and rotates with the connector element 59 which rotates with the gear adjacent thereto. The interlocked surfaces 62 and 63 of the connector elements 59 and 61 remain in engagement with each other until the shift fork 66 is shifted and the connector element 61 carried by the gear selector element moves to a position in advance of the connector element 59 which rotates with the adjacent gear.

While the gear selector elements are urged to their innermost position relative to each other by the springs 47, the free ends of the elongated members 43 move to a position to engage and limit rearward relative rotary movement of an adjacent connector element 59 which is rotatable with the gear adjacent thereto. As shown in FIG. 5, the trailing edge of each connector element 59 slopes rearwardly and away from the gear adjacent thereto and the adjacent end of the elongated member 43 is curved or slopes forwardly and toward the gear adjacent thereto to thus provide an interlock between the end of the elongated member 43 and the trailing edge of the connector member 59. The free end of the elongated member 43 thus forms a stop member to limit relative rearward movement of the adjacent connector element 59. Also, as shown in FIG. 5, the elongated member 43 is provided with a sloping cam surface 69 at the free end thereof disposed to be engaged by an adjacent connector element 59 upon forward rotary movement of the adjacent gear, as the connector element 59 moves from the dotted line position to the solid line position, while the elongated member 43 is in the position shown in FIG. 5 to thus move the elongated member 43 out of the path of forward rotary movement of the connector element 59 which rotates with the adjacent gear.

From the foregoing description, the operation of my improved selector mechanism will be readily understood. FIG. 2 shows the gear selector mechanism in the first gear position. Before shifting the actuator member 66 to the first gear position, both actuator members 66 shown in FIG. 2 are in their neutral positions whereby the connector elements 59 and 61 are all out of engagement with each other. Power is transmitted from drive shaft 10 through the fourth gear 11 to gear 12 which is mounted on idler shaft 13. Power is then transmitted from gears 14, 16 and 17, which rotate with idler shaft 13, to gears 18, 27 and 29, respectively. Since the gears 18, 27 and 29 rotate freely on the smooth surfaces on shaft 21. no power is transmitted to the drive shaft 21 while both shift forks 66 are in the neutral position.

FIG. 2 shows the actuator member 66 for the gear selector elements 36 and 37 shifted toward the right whereby the connector elements 61 of gear selector element 37 move into engagement with the connector elements 59 on th annular member 58 carried by the first gear 29. Accordingly, power is transmitted from first gear 29 through the connector elements 59 and 61 to the gear selector element 37 which in turn is connected non-rotatably to the sleeve member 38. Since sleeve member 38 is keyed to shaft 21, power is then transmitted to shaft 21 while the actuator member 66 is in the position shown in FIG. 2.

To shift the transmission to the second gear position, the actuator member 66 for the gear selector elements 36-37 is shifted toward the left, as viewed in FIG. 3, whereby the connector elements 61 on the gear selector element 36 move into engagement with the connector elements 59 carried by the annular member 49 connected to the second gear 27. Due to the interlock relationship between the surfaces 62 and 63 of the connector elements 59 and 61, the connector elements 61 of the gear selector element 37 remain in contact with the connector elements 59 as the actuator member 66 is shifted toward the left to second gear position, as shown in FIG. 3. Since second gear 27 is rotating at a faster speed than first gear 29, and due to the fact that second gear 27 is connected in driving relation to the gear selector element 36 which in turn rotates with gear selector element 37, as described above, the connector elements 61 of the gear selector element 37 move or rotate faster than the adjacent connector elements 59. Accordingly, the connector elements 61 carried by the gear selector element 37 move to an angular position in advance of the position of the adjacent connector elements 59 whereby the surfaces 62 and 63 are no longer interlocked. As this occurs, the tension springs 47 urge the selector element 37 away from the first gear 29 the position shown in FIG. 4.

The transmission remains in the second gear setting until the actuator member 66 for the gear selector elements 36-37 is shifted to neutral position and the actuator member 66 for the gear selector elements 33-34 is shifted toward the right, as viewed in FIG. 2, to move the gear selector element 34 toward the annular member 57 carried by the third gear 18. The connector elements 61 of the gear selector element 34 thus engage the adjacent connector elements 59 carried by the annular member 57 whereby power is transmitted from the third gear 18 to the gear selector element 34 and then to the shaft 21. Since the third gear 18 rotates faster than the second gear 27, and is now operatively connected to shaft 21, the gear selector element 36 will rotate at a greater speed than the adjacent annular member 49 whereby the connector element 61 carried by the gear selector element 36 will move in advance of the connector elments 59 carried by the adjacent annular member 49 which rotates with the second gear 27. Upon movement of the connector element 61 of the gear selector element 36 out of engagement with the adjacent connector element 59, the tension springs 47 move the gear selector element 36 from the position shown in FIG. 4 to a neutral position out of engagement with annular member 49.

The connector elements 61 on the gear selector element 34 then remain in contact with the adjacent connector elements 59 carried by the annular member 57 until the actuator member 66 is shifted toward the left, as viewed in FIG. 2, to the fourth gear setting. In this position, the connector elements 61 on the gear selector element 33 move into engagement with the connector elements 59 carried by the adjacent annular member 49 whereby rotary motion is then transmitted from the fourth gear 11 through gear selector element 33 to the shaft 21. Since the fourth gear 11 is rotating faster than the third gear 18, the connector elements 61 carried by the gear selector element 34 move to a position in advance of the adjacent connector elements 59 carried by the annular member 57 to thus permit the cooperating surfaces 62 and 63 to move away from each other whereupon the tension springs 47 move the gear selector element 34 toward the left, as viewed in FIG. 2, and out of engagement with the annular member 57.

The gear selector element 33 remains in the fourth gear position until the actuator member 66 is shifted toward the right as viewed in FIG. 2. Upon reducing power transmitted to the drive shaft 10, the connector elements 61 on the gear selector element 33 tend to move to a position in advance of the connector elements 59 carried by the adjacent annular member 49 whereupon the tension springs 47 move the gear selector element 33 toward the right to the neutral position shown in FIG. 2.

With the gear selector elements 33–34 and 36–37 in their innermost positions relative to each other, the elongated stop members 43 project to the position clearly shown in FIG. 5 whereby the curved surface of the stop member 43 engage the trailing edge of the adjacent connector element 59 to thus limit relative rearward angular movement of the connector element 59 relative to the connector element 61. Due to the interlocking relationship between the trailing edge of the connector element 59 and the adjacent curved portion of the stop member 43, the connector elements 59 and 61 remain in interlocked relationship to each other until the stop member 43 is moved laterally out of the path of movement of the trailing edge of the connector member 59 adjacent thereto. While the cooperating surfaces 62 and 63 are in engagement with each other, the connector elements 59 and 61 are held against separation. On the other hand, upon movement of the co- operating surfaces 62 and 63 away from each other, as shown in FIG. 5, the trailing edge of the connector element 59 engages the curved surface on the stop member 43 to thus prevent separation of the connector elements 59 and 61. However, upon shifting the actuator member 66 to move the adjacent gear selector elements 33–34 or 36–37, as the case may be, away from each other the elongated stop members 43 move out of the path of movement of the connector elements 59 adjacent thereto, whereby upon separation of the adjacent cooperating surfaces 62 and 63 the tension springs 47 move the gear selector element thus released and its connector elements 61 out of the path of rotation of the connector element 59 adjacent thereto.

From the foregoing, it will be seen that I have devised an improved selector mechanism for a transmission. By providing mechanism for shifting the power transmitting rotary members, such as gears of the transmission to selected positions without having to reduce the speed of rotation of the gears, during the shift operation, I not only provide a smoother change of gears but also provide a substantially positive drive throughout each gear changing operation. Also, I eliminate the necessity of having to operate a clutch unit each time the gears are changed, it being necessary to actuate the clutch only during movement of the transmission to the first gear setting. Furthermore, by providing gear selector mechanism which operates in a positive manner by merely shifting the actuator member from one gear setting to another, the apparatus may be operated in an efficient manner by unskilled labor and at the same time I bring about a material saving in power consumption and the time actually required to shift the gears.

While I have shown my invention in but one form, it will be obvious to those skilled in the art that it is not so limited, but is susceptible of various other changes and modifications, without departing from the spirit thereof.

What I claim is:

1. In a selector for a transmission having a rotatable shaft-like member and a least one pair of power transmitting rotary members mounted for rotation about an axis which is common with the axis of rotation of said shaft-like member with means operatively connecting said rotary members in driving relation with each other:
   a. a selector element for each said rotary member mounted non-rotatably on said shaft-like member adjacent a side of each said rotary member and adapted for axial movement relative thereto,
   b. means urging each said selector element axially away from the rotary member adjacent thereto,
   c. at least one connector element rotatable with each said rotary member of said pair of rotary members at the side thereof adjacent said selector element,
   d. at least one cooperating connector element carried by each said selector element disposed to engage and rotate with said connector element which is rotatable with the rotary member adjacent thereto upon axial movement of said selector element toward said rotary member adjacent thereto and disposed to disengage said connector element which is rotatable with the rotary member adjacent thereto upon axial movement of said selector element away from said rotary member adjacent thereto, and e. an actuator member disposed to shift each said selector element toward the rotary member adjacent thereto so that its cooperating connector element moves into engagement with and rotates with said connector element which is rotatable with said rotary member adjacent thereto until said actuator member is shifted and said cooperating connector element carried by said selector element moves to a position in advance of said connector element rotatable with said rotary member.

2. A selector for a transmission as defined in claim 1 in which said connector element rotatable with said rotary member and said cooperating connector element carried by said selector element have cooperating surfaces which interlock with each other upon movement of said connector elements into engagement with each other.

3. A selector for a transmission as defined in claim 2 in which the portions of said connector elements which interlock with each other comprise engaging surfaces which slope forward and away from the rotary member adjacent thereto as viewed in the direction of rotation of said rotary member adjacent thereto.

4. A selector for a transmission as defined in claim 1 in which said connector element which is rotatable with said rotary member and said cooperating connector element carried by said selector element have sloping cam surfaces which are adapted to move into and out of engagement with each other upon axial movement of said selector element toward and away from said rotary member adjacent thereto.

5. A selector for a transmission as defined in claim 1 in which at least one movable stop member is carried by said selector element in position to engage and limit rearward rotary movement of an adjacent connector element which is rotatable with said rotary member and means is provided for moving said stop member out of the path of movement of said connector element which is rotatable with said rotary member prior to disengagement of said connector elements with each other.

6. A selector for a transmission as defined in claim 5 in which said stop member is provided with a sloping cam surface disposed to be engaged by an adjacent connector element rotatable with said rotary member upon forward rotary movement of said rotary member to move said stop member out of the path of forward movement of said connector element rotatable with said rotary member.

7. A selector for a transmission as defined in claim 1 in which the rotary members of said pair of rotary members are spaced axially from each other with a pair of said selector elements therebetween and said means urging said selector element axially away from the rotary member adjacent thereto comprises resilient means connected to and extending between said selector elements and urging said selector elements toward each other.

8. A selector for a transmission as defined in claim 7 in which each selector element carries angularly spaced laterally extending guide members and guide grooves therein with the guide members of one selector element riding in the guide grooves of the other selector element.

9. A selector for a transmission as defined in claim 8 in which said guide members are in position to engage and limit rearward movement of an adjacent connector element rotatable with an adjacent rotary member until said selector elements are moved away from each other whereupon said guide members move out of the path of movement of said connector element rotatable with said rotary member.

10. A selector for a transmission as defined in claim 9 in which said shaft-like member is provided with axially extending external splines which cooperate with axially extending internal splines on said selector elements.

11. A selector for a transmission as defined in claim 1 in which the connector element rotatable with said each rotary member is carried by an annular member mounted at the side of said rotary member and resilient means operatively connects said annular member to said rotary member.

12. In a selector for a transmission having a rotatable shaft-like member and a least one pair of power transmitting rotary members mounted for rotation about an axis which is common with the axis of rotation of said shaft-like member with means operatively connecting said rotary members in driving relation with each other:

a. a selector element for each said rotary member mounted non-rotatably on said shaft-like member adjacent a side of each said rotary member, b. at least one connector element rotatable with each rotary member of said pair of rotary members at the side thereof adjacent said selector element with each said selector element and the connector element rotatable with the adjacent rotary member being adapted for relative axial movement, c. means urging each said selector element and the connector element rotatable with the adjacent rotary member axially away from each other, d. at least one cooperating connector element carried by each said selector element disposed to engage and rotate with said connector element which is rotatable with the rotary member adjacent thereto upon relative axial movement of said selector element and the adjacent connector element rotatable with the rotary member toward each other and disposed to disengage said connector element which is rotatable with the rotary member adjacent thereto upon relative axial movement of said selector element and the adjacent connector element rotatable with the rotary member away from each other, and e. actuator means disposed to impart relative axial movement between each said selector element and the connector element rotatable with the rotary member adjacent thereto so that adjacent connector elements are movable into engagement with and rotate with each other until said actuator means is shifted and said cooperating connector element carried by said selector element moves to a position in advance of said connector element rotatable with said rotary member.

* * * * *